(12) United States Patent
Takeuchi

(10) Patent No.: US 11,240,094 B2
(45) Date of Patent: *Feb. 1, 2022

(54) INFORMATION PROCESSING APPARATUS, INFORMATION PROCESSING METHOD, AND COMPUTER-READABLE MEDIUM

(71) Applicant: CANON KABUSHIKI KAISHA, Tokyo (JP)

(72) Inventor: Takuya Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,895

(22) Filed: Aug. 29, 2019

(65) Prior Publication Data

US 2019/0386870 A1 Dec. 19, 2019

Related U.S. Application Data

(63) Continuation of application No. 15/157,869, filed on May 18, 2016, now Pat. No. 10,439,863.

(30) Foreign Application Priority Data

May 29, 2015 (JP) ................. 2015-110806

(51) Int. Cl.
 *G06F 15/173* (2006.01)
 *H04L 12/24* (2006.01)
 *H04L 29/06* (2006.01)

(52) U.S. Cl.
 CPC ...... *H04L 41/0213* (2013.01); *H04L 41/0853* (2013.01); *H04L 65/4076* (2013.01)

(58) Field of Classification Search
 CPC ............ H04L 41/0213; H04L 41/0853; H04L 65/4076
 USPC ................................... 709/223, 224
 See application file for complete search history.

(56) References Cited

U.S. PATENT DOCUMENTS

| 5,018,060 | A | * | 5/1991 | Gelb | ............ | G06F 16/221 |
| 5,842,023 | A | | 11/1998 | Tsumura | | |
| 6,014,677 | A | | 1/2000 | Hayashi et al. | | |
| 7,085,814 | B1 | * | 8/2006 | Gandhi | ............ | H04L 29/1232 |
| | | | | | | 709/208 |
| 7,191,241 | B2 | * | 3/2007 | Boucher | ............ | H04L 69/16 |
| | | | | | | 709/230 |

(Continued)

FOREIGN PATENT DOCUMENTS

| JP | 08-292922 A | 11/1996 |
| JP | 2008146410 A | 6/2008 |

(Continued)

OTHER PUBLICATIONS

Japanese Office Action issued in corresponding Japanese Application No. 2015110806 dated Mar. 15, 2019.

*Primary Examiner* — Thu Ha T Nguyen

(74) *Attorney, Agent, or Firm* — Venable LLP

(57) ABSTRACT

First device information, which is information independent from settings of a device or functions of a device, is obtained from a device in bulk; second device information, which is information that depends on settings of a device or functions of a device, is obtained; and the obtained first and second device information are stored in a storage unit. A device connected through communication is then specified on the basis of the obtained first device information.

30 Claims, 4 Drawing Sheets

(56) References Cited

U.S. PATENT DOCUMENTS

| | | | | |
|---|---|---|---|---|
| 7,246,153 B2* | 7/2007 | Tsuchitoi | | G06F 3/1204 358/1.15 |
| 7,620,642 B2 | 11/2009 | Zurek et al. | | |
| 8,166,403 B2* | 4/2012 | Torii | | H04W 4/02 715/734 |
| 8,312,122 B2* | 11/2012 | Ishimoto | | G06F 3/1285 358/3.28 |
| 8,918,657 B2 | 12/2014 | Cameron et al. | | |
| 10,089,070 B1* | 10/2018 | Kanjariya | | G06F 3/167 |
| 2002/0124059 A1* | 9/2002 | Takahashi | | H04L 41/22 709/219 |
| 2003/0149763 A1* | 8/2003 | Heitman | | G06F 3/0601 709/224 |
| 2004/0249927 A1* | 12/2004 | Pezutti | | G06F 15/173 709/223 |
| 2005/0015498 A1* | 1/2005 | Okazawa | | H04L 63/10 709/227 |
| 2005/0148326 A1* | 7/2005 | Nogawa | | H04L 41/0806 455/420 |
| 2005/0254090 A1 | 11/2005 | Kammerlocher et al. | | |
| 2005/0281270 A1* | 12/2005 | Kossi | | H04L 12/2854 370/395.5 |
| 2006/0129669 A1* | 6/2006 | Kojima | | H04L 41/082 709/223 |
| 2007/0045427 A1 | 3/2007 | Onishi | | |
| 2007/0133736 A1 | 6/2007 | Chen et al. | | |
| 2007/0297006 A1* | 12/2007 | Ohshima | | G06F 3/1288 358/1.15 |
| 2008/0062891 A1* | 3/2008 | Van der Merwe | | H04L 45/04 370/254 |
| 2008/0232370 A1* | 9/2008 | Lee | | H04L 29/12933 370/392 |
| 2010/0002257 A1* | 1/2010 | Isshiki | | H04N 1/40068 358/1.15 |
| 2010/0071000 A1* | 3/2010 | Amento | | H04N 21/25891 725/39 |
| 2011/0075206 A1* | 3/2011 | Ando | | H04L 61/103 358/1.15 |
| 2011/0099009 A1 | 4/2011 | Zopf et al. | | |
| 2012/0162013 A1* | 6/2012 | Piersol | | H04W 64/003 342/386 |
| 2012/0177041 A1* | 7/2012 | Berman | | H04L 69/22 370/392 |
| 2012/0177043 A1* | 7/2012 | Berman | | H04L 49/357 370/392 |
| 2012/0209974 A1* | 8/2012 | Igarashi | | H04L 41/046 709/223 |
| 2012/0218572 A1* | 8/2012 | Kishino | | H04N 1/6066 358/1.9 |
| 2013/0135686 A1* | 5/2013 | Abe | | H04N 1/6055 358/406 |
| 2013/0165226 A1* | 6/2013 | Thorner | | A63F 13/24 463/37 |
| 2014/0289400 A1* | 9/2014 | Saito | | H04N 1/00344 709/224 |
| 2015/0310559 A1* | 10/2015 | Kaafarani | | G06Q 40/08 705/4 |
| 2016/0294605 A1* | 10/2016 | Searle | | H04L 41/082 |
| 2016/0294614 A1* | 10/2016 | Searle | | H04L 67/34 |
| 2016/0295567 A1* | 10/2016 | Nogawa | | H04W 4/06 |
| 2016/0352558 A1* | 12/2016 | Takeuchi | | H04L 41/0853 |
| 2017/0086237 A1* | 3/2017 | Ando | | H04W 76/11 |
| 2017/0290078 A1* | 10/2017 | Suzuki | | H04W 76/14 |
| 2020/0259896 A1* | 8/2020 | Sachs | | H04W 12/03 |

FOREIGN PATENT DOCUMENTS

| | | |
|---|---|---|
| JP | 2009-230666 A | 10/2009 |
| JP | 2009245024 A | 10/2009 |
| JP | 2011-142577 A | 7/2011 |

* cited by examiner

FIG. 4

| MAC ADDRESS | SerialNumber | MODEL NAME | BONJOUR NAME | DeviceID |
|---|---|---|---|---|
| 000085AABBCC | XXXX0001 | MGXXXX | MGXXXX | MFG:Canon;CMD:XXX... |
| 000085DDEEFF | XXXX0002 | MGYYYY | ... | ... |
| ... | | | | |

401　402　403　404　405

INFORMATION PROCESSING APPARATUS, INFORMATION PROCESSING METHOD, AND COMPUTER-READABLE MEDIUM

CROSS-REFERENCE TO RELATED APPLICATION

The present application is a Continuation of U.S. patent application Ser. No. 15/157,869, filed May 18, 2016, which claims the benefit of Japanese Patent Application No. 2015-110806, filed May 29, 2015, the entire disclosures of which are both hereby incorporated by reference herein.

BACKGROUND OF THE INVENTION

Field of the Invention

The present invention relates to an information processing apparatus, an information processing method, and a computer-readable medium that control a network device through network management software that uses a protocol such as SNMP.

Description of the Related Art

Simple Network Management Protocol (SNMP) has been devised in order to manage devices and the like located on a network, and is used as a communication protocol when managing devices and the like. A network management system that uses the SNMP can obtain and change the configuration of management information for a network device to be managed, which is called a "managed node". Meanwhile, communication using the SNMP can obtain multiple pieces of attribute information in bulk by specifying multiple attributes in a single SNMP message. When obtaining multiple pieces of attribute information in bulk, an obtainment error for even a single piece of information to be obtained will result in an error in the SNMP request itself. Accordingly, a method that prevents information obtainment errors by creating an SNMP request message excluding the attribute portion that caused the obtainment error and issuing the request again has been proposed (see Japanese Patent Laid-Open No. 8-292922).

However, when carrying out communication such as a device search aimed at multiple managed nodes using the SNMP, executing a resending process for devices that returned an error when obtaining information can cause a tremendous increase in communication traffic. Meanwhile, in the case where multiple attributes causing obtainment errors are present in the multiple attributes to be obtained, the communication traffic will increase in proportion to the number of error items.

SUMMARY OF THE INVENTION

The present invention makes it possible to obtain multiple pieces of information regarding a device while reducing the influence thereof on communication traffic.

An information processing apparatus according to the present invention has the following configuration.

According to a first aspect, there is provided an information processing apparatus comprising: a first obtainment unit that obtains first device information from a device in bulk, the first device information being independent from settings of the device or functions of the device; a second obtainment unit that obtains second device information from a device, the second device information being information that depends on settings of the device or functions of the device; a storage unit that stores the first device information obtained by the first obtainment unit and the second device information obtained by the second obtainment unit; and a specifying unit that specifies a device connected through communication on the basis of the first device information obtained by the first obtainment unit.

According to the present invention, multiple pieces of information regarding a device can be obtained while suppressing communication traffic.

Further features of the present invention will become apparent from the following description of exemplary embodiments with reference to the attached drawings.

BRIEF DESCRIPTION OF THE DRAWINGS

FIG. 4 is a diagram illustrating an example of a search result list.

DESCRIPTION OF THE EMBODIMENTS

In the invention according to the present embodiment, when searching for a device using the SNMP, and SNMP ver.1 in particular, information to be obtained is not handled as a single entity, but is instead divided into information assumed to be obtainable regardless of settings, functions, and so on of the device (device-independent information) and information that may or may not be obtainable depending on the settings, functions, and so on of the device (device-dependent information), and obtained as such. Dividing the obtainment of information in accordance with the type of the information makes collective error processing on the obtained information unnecessary, which in turn makes it possible to search for devices and obtain (or collect) multiple pieces of device information while reducing effects on communication traffic.

First Embodiment

System Configuration

Figure 1:
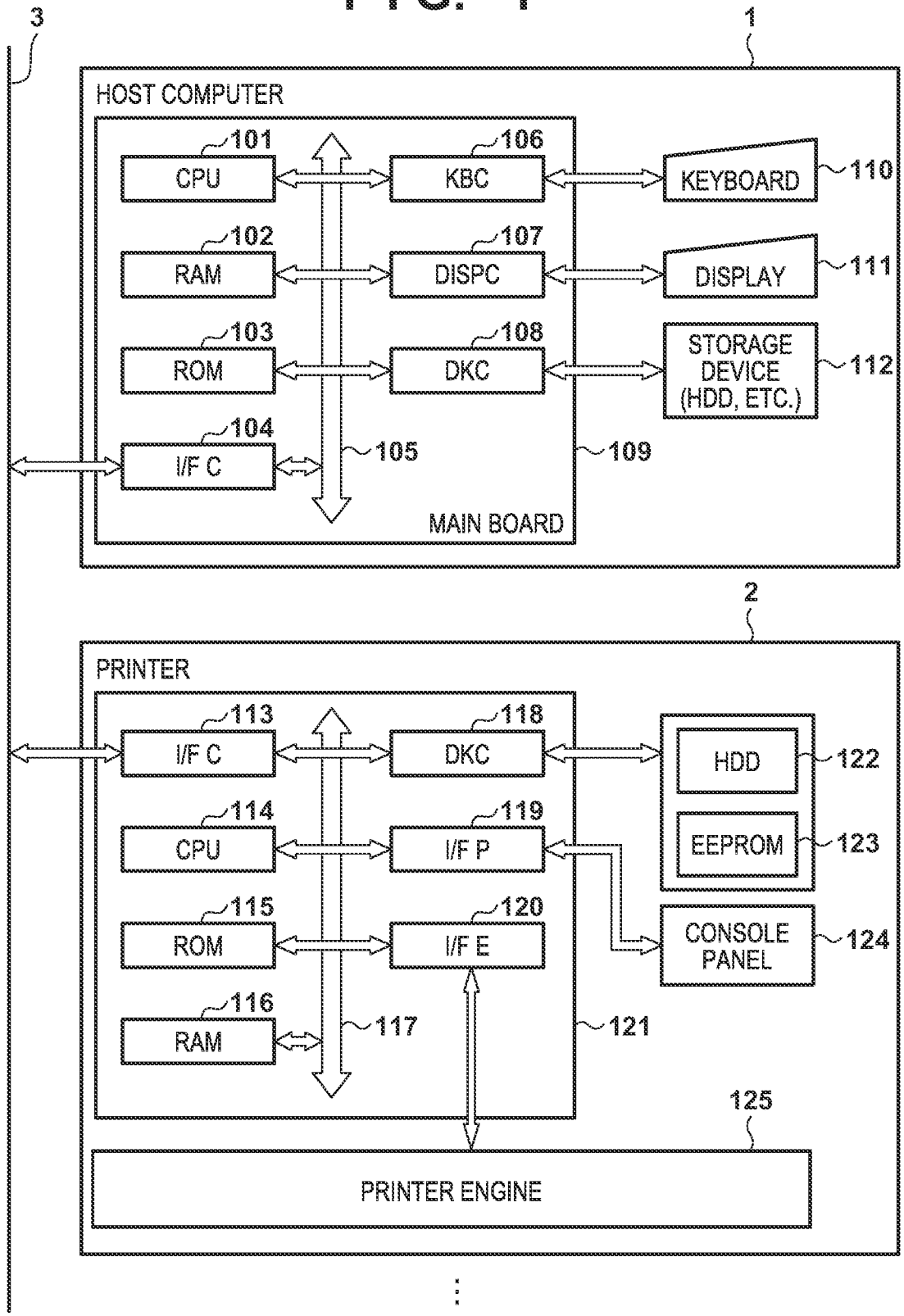
FIG. 1 is a diagram illustrating the configuration of an information collecting apparatus and a device according to a first embodiment.

FIG. 1 is a block diagram schematically illustrating a device management system including a host computer 1 ("host" hereinafter), serving as an example of an information processing apparatus according to the present invention, and a plurality of printers. The present embodiment describes an example in which the devices to be managed are printers and a process through which the host searches for those printers is carried out. Note that the printers are not limited to single-function printers, and may be multi-function printers that combine, for example, a printer function with a scanner function or the like. Likewise, the devices to be managed are not limited to printers, and may be other information processing apparatuses.

As illustrated in FIG. 1, the host 1 and a printer 2 are connected to each other by a predetermined bidirectional interface 3. A personal computer (PC) can be given as an example of the host 1. The host 1 functions as an information collecting apparatus that obtains device information from the printer 2, which is a connected device. The host 1 includes a main board 109 having a CPU 101 and the like, a keyboard 110, a display 111 such as an LCD, and a storage device 112 such as a hard disk (HDD). The main board 109 further includes a RAM 102, a ROM 103, and a keyboard controller (KBC) 106 that controls input from the keyboard 110, a pointing device (not illustrated), and the like. The keyboard controller 106 is also called an "operating unit" or an "input unit". A display controller (DISPC) 107 controls a display made by the display 111. The RAM 102 functions as a main memory or a work area for the CPU 101. The ROM 103 stores a boot program and the like.

A disk controller (DKC) 108 controls access to the storage device 112 such as a hard disk. The storage device 112 stores an update program, an operating system, various types of applications, and so on that execute various functions according to the present embodiment. Protocol stacks including SNMP, TCP/IP serving as the base thereof, and so on are also stored in the storage device 112 as program files.

An interface controller (I/F C) 104 is connected to the printer 2 by the bidirectional interface 3, which is realized through communication over a LAN or the like, and controls processes for communicating data and commands with the printer 2.

The printer 2 includes a controller 121, a printer engine 125, a console panel 124, and a non-volatile storage device 138, and is connected to the host 1 by the bidirectional interface 3. The non-volatile storage device 138 includes a hard disk (HDD) 122 or an EEPROM 123. The non-volatile storage device is also called a "non-volatile memory".

The controller 121 includes a CPU 114, a ROM 115, a RAM 116, an interface controller (I/F C) 113, a disk controller (DKC) 118, a panel interface (I/F P) 119, and an engine interface (I/F E) 120).

The CPU 114 performs overall control of the respective stated constituent elements connected to a system bus 117, and executes various types of programs. The ROM 115 receives print image data and commands from the host 1, and stores programs, various types of data, and so on for realizing optimal printing by controlling the printer engine 125. The RAM 116 is used as a work area for temporarily storing various types of data, various types of programs, and so on. Protocols including SNMP, TCP/IP serving as the base thereof, and so on are also stored in the ROM 115. Meanwhile, a management information base (MIB) including device information and the like of the printer 2 is stored in one of the storage units, such as the ROM 115, the HDD 122, or the like.

The interface controller (I/F C) 113 is connected to the host 1 by the bidirectional interface 3, and controls processes for communicating data and commands with the host 1. The hard disk (HDD) 122 stores large-size data such as data from the host 1, additional information associated with that data, and so on. The EEPROM 123 stores information unique to recording devices used during recording operations. The disk controller (DKC) 118 controls access to the hard disk 122, which is a non-volatile storage device, the EEPROM 123, and so on. The panel interface (I/F P) 119 controls displays made in the console panel 124, inputs from the console panel 124, and so on. The engine interface (I/F E) 120 controls the printer engine 125 for realizing optimal recording by directly controlling hardware.

A printer engine that employs an ink jet recording method, a printer engine that employs an electrophotographic method, or the like can be used for the printer engine 125.

Device Management System

Figure 2:
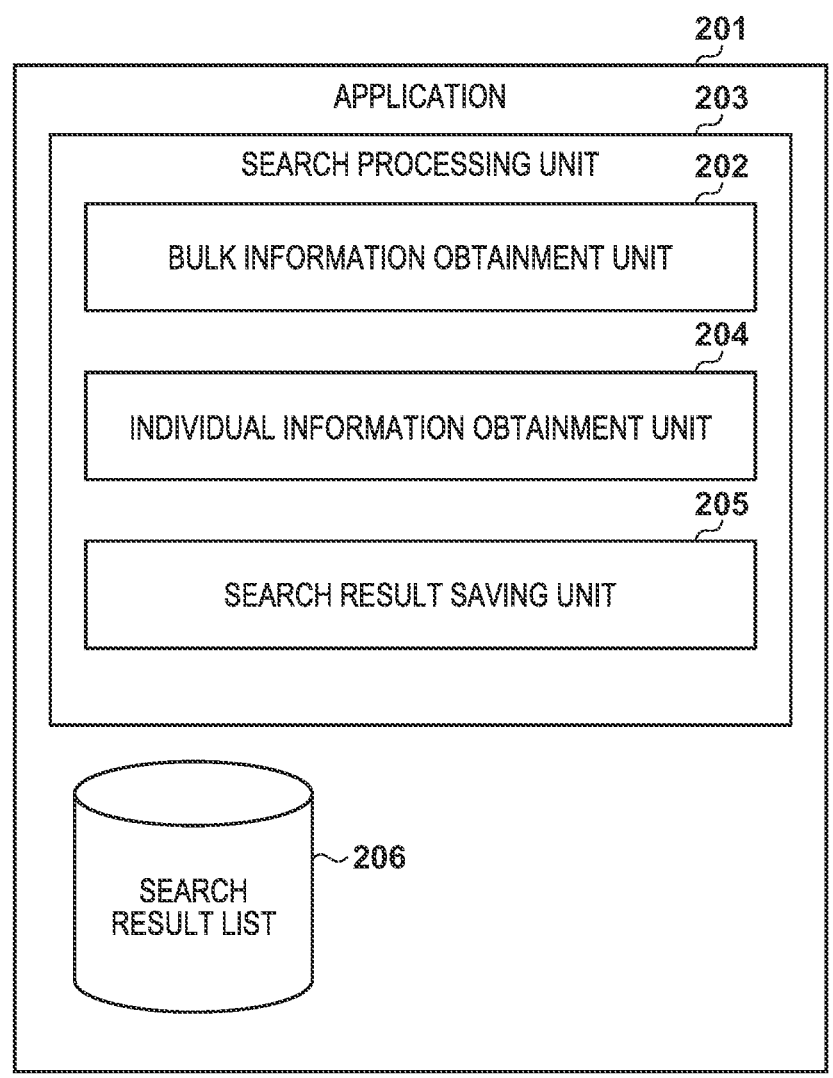
FIG. 2 is a diagram illustrating the software configuration of a host computer according to the first embodiment.

FIG. 2 is a block diagram illustrating the configuration of a search function in a device management system according to the present embodiment. Functions of the host computer will be described. An application 201 is a program executed by the host 1, and executes a process for searching for devices connected to the bidirectional interface 3.

A search processing unit 202 is a processing unit that handles a process for searching devices, and includes a bulk information obtainment unit 203, an individual information obtainment unit 204, and a search result saving unit 205. The bulk information obtainment unit 203 executes a sending process for sending SNMP search packets to a plurality of devices and a process for receiving response packets from the devices. Although the process for sending to a plurality of devices is described as broadcast communication in the present embodiment, this communication may be multicast instead.

The individual information obtainment unit 204 executes a sending process for sending individual information obtainment packets to each device through unicast and a process for receiving response packets from the devices.

The search result saving unit 205 executes a process for saving information in a search result list 206 on the basis of obtainment result information and an obtainment error state in the bulk information obtainment unit (or bulk obtainment unit) 203 and the individual information obtainment unit (or individual obtainment unit) 204. The search result list 206 is a database that holds search result information obtained by the search processing unit 202 as a search result list. Details of the search result list saved as the search result list 206 according to the present embodiment will be described with reference to FIG. 4.

Obtainment Processing Sequence

Figure 3:
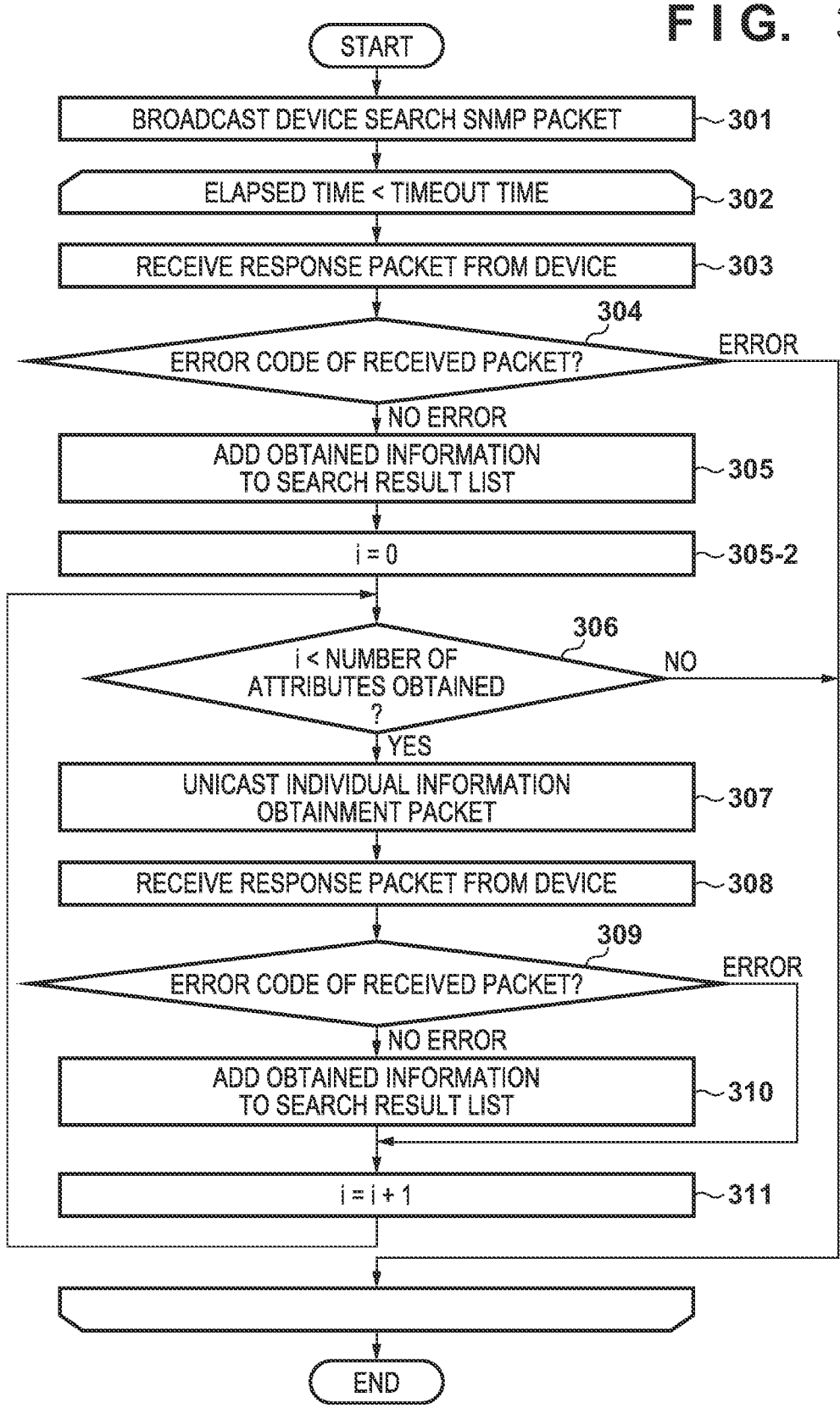
FIG. 3 is a flowchart illustrating processing executed by the host computer according to the first embodiment.

FIG. 3 is a flowchart illustrating the flow of processing performed by a search program (which is stored in the storage device 112 of the host 1) that executes various functions according to the present embodiment. The sequence in FIG. 3 is realized by the search program being loaded into the RAM 102 and executed by the CPU 101.

Upon the search processing unit 202 of the application 201 being executed, first, the host 1 broadcasts an SNMP search packet to the bidirectional interface 3 (301). The search packet requests information that can be received regardless of the settings, functions, and so on of the device (called "common information" or "device-independent information"), and thus a GetRequest is used, for example. In the present embodiment, information for identifying the device, such as a MAC address 401, a serial number 402, and a model name 403 as indicated in FIG. 4, serves as the device-independent information obtained through the search packet broadcast. In this manner, a plurality of types of device-independent information are requested in bulk. At this time, multiple object designation packets are used in order to request a plurality of types of device-independent information. A device that has received a search packet responds with a Response packet.

The following processing is continued until a predetermined time limit is reached after the search packet has been sent (302). That is, the system stands by for a response packet (Response) from a target device, the processing from step 304 to step 311 is executed upon the response packet being received, and once that processing ends, the system stands by to receive the next response packet in step 303. If there is a response packet that has already been received at this point in time, the processing from step 304 on may be executed immediately for that packet. A device that returns a response within the time limit is a device discovered (specified) through the search.

After the SNMP search packet is sent in step 301, a reception process for receiving a response packet from each device is carried out (303). In the case where a packet has been received from a device, it is determined whether the error code of the received packet is noError (indicating no error) (304). In the case where the error code is not noError, the information is not added to the search result list 206; instead, the processing for the response packet from that device is ended, and the reception processing is continued from the next device (printer, in the present embodiment).

In the case where the response from the printer to the search packet indicates noError, the obtained information is added to the search result list, a variable i is reset to 0, and the processing from steps 306 to 311 is continued. There are cases where, depending on the request, the received response includes a plurality of types of device information. The obtained information is registered in the search result list 206 by information type, in association with a device ID of the device that sent the response packet, for example.

In the processing from steps 306 to 311, information that can or cannot be received depending on the settings, functions, and so on of the device is obtained by unicasting obtainment packets on an attribute-by-attribute basis. This information that can or cannot be received depending on the settings, functions, and so on of the device is information provided in accordance with the configuration, settings, and so on of the device, for example, and is called "individual information" or "device-dependent information". In the present embodiment, a Bonjour name 404 and a DeviceID 405 indicated in FIG. 4 serve as the device-dependent information obtained when obtaining the individual information. The Bonjour name 404 may be unable to respond to a request to obtain the individual information and result in an error in the case where a Bonjour function (a function for assigning IP addresses and host names, automatically discovering services, and so on) is turned off on the printer side. The DeviceID may be unable to be obtained depending on the functions of the device. For example, although DeviceID information associated with a Scan function can be obtained from a device having a Scan function, such DeviceID information cannot be obtained from other devices, which results in the obtainment request failing. In this manner, there are cases where the device-dependent information cannot be obtained.

The processes of steps 307 to 310 are repeated for the attributes whose information is to be obtained, and the process ends for that device once steps 307 to 310 have ended for all of the attributes (306). When obtaining the individual information, a request packet for obtaining a single piece of information is unicast on an attribute-by-attribute basis (307). The target (destination) of the request packet in this step is the device that sent the response packet received in step 303. At this time, a single object designation packet is used in order to request a single type of device information. In the present embodiment, the Bonjour name and the DeviceID are requested using independent request packets (individual information obtainment packets, in other words). A response packet is then received from the device for each of the individual information obtainment packets (308). After receiving the response packet, the received response packet is analyzed and it is determined whether or not there is noError (no error) (309). In the case where the received packet is not noError, the process moves on to obtaining the next attribute (311). However, in the case where the received packet is noError, the obtained information is added to the search result list 206 (310), after which the process moves on to obtaining the next attribute (311). At this time, the information obtained (received) in step 308 corresponds to the information obtained (received) in step 303 and is therefore saved in association with the information obtained (received) in step 303.

FIG. 4 is a diagram illustrating an example of the search result information stored in the search result list 206. The MAC address 401, serial number 402, and model name 403 of each device are in the present embodiment information obtained through the process of step 303 and registered in step 305, and are information that can be obtained regardless of the settings of the device. The Bonjour name 404 and DeviceID 405 are in the present embodiment information obtained through the process of step 308 and registered in step 310, and are information that can or cannot be obtained depending on the settings or functions of the device. In FIG. 4, a printer having a MAC address of "000085AABBCC" is an example of a device for which all of the information has been successfully obtained. However, a printer having a MAC address of "000085DDEEFF" is an example of a device where the Bonjour name 404 and DeviceID 405 have both returned obtainment errors with respect to individual information obtainment packets. Note that the individual information is requested individually for each type of information, and thus there are also cases where only one of these pieces of information is successfully obtained. In this manner, in the present embodiment, the device-independent information can be obtained and device search results can be obtained even in the case where the individual information cannot be obtained.

Although the device-independent information and the device-dependent information are determined in advance in the present embodiment, the invention is not limited thereto. For example, one of the device-dependent information and the device-independent information may be determined in advance, and information not belonging to the information determined in advance may be handled as the other type of information. The MIB has a tree structure, and thus information at a predetermined or lower node may be set as the device-independent information or the device-dependent information. In either case, the device-independent information and the device-dependent information are determined prior to executing the sequence illustrated in FIG. 3 (are predetermined, in other words), and information for distinguishing between the two is stored in the storage device 112, for example. Then, when a request for information is issued to a device, the information for distinguishing between the device-dependent information and the device-independent information is referred to, and packets for requesting the information handled in step 301 and in step 307, respectively, are then sent.

Although device information that was not successfully received through the foregoing sequence is not updated until the next collection, the invention is not limited thereto, and a predetermined number of requests may be resent for device information that was not successfully received. In the case of a timeout, it is possible that the device has been turned off or communication has been interrupted, and it is therefore desirable to attempt the resend after a predetermined amount of time has passed.

In addition, although the above embodiment describes obtaining the device-dependent information individually, the invention is not limited thereto, and the device-dependent information may be obtained in bulk. In other words, a plurality of types of the device-dependent information may be obtained in bulk. In the present embodiment, a process for obtaining information assumed to be returnable regardless of the settings, functions, and so on of the device, and a process for obtaining information that may or may not be returnable depending on the settings of the device, the functions of the device, or both, are carried out separately. Devices to be managed can then be searched (discovered) on the basis of at least the device-independent information, which does not depend on the settings, functions, and so on of the device. In this manner, according to the present embodiment, the device-independent information can be obtained regardless of the result of obtaining the device-dependent information, which makes it possible to suppress the device search from failing. Furthermore, by combining the results of returning the device-independent information and the device-dependent information as the search result, a plurality of pieces of information can be obtained through the search while suppressing communication traffic.

Note that when searching for devices using the SNMP, it is necessary to communicate with a device several times in the case where a plurality of pieces of information are obtained one at a time; this extends the processing time and increases the communication traffic. As opposed to this, according to the present embodiment, the device-dependent information is obtained in bulk when searching for devices using the SNMP. Through this, a device search can be executed and a plurality of pieces of attribute information can be obtained while reducing the effects on communication traffic.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110806, filed May 29, 2015, which is hereby incorporated by reference herein in its entirety.

What is claimed is:

1. An information processing apparatus comprising:
at least one processor causing the information processing apparatus to act as;
a first obtainment unit that performs a first obtainment process including transmitting, using Simple Network Management Protocol (SNMP), a search packet for requesting a plurality of types of information including first information and second information, and obtaining the plurality of types of information in a response packet transmitted from a device that receives the search packet; and
a second obtainment unit that performs a second obtainment process including transmitting, to the device that transmits the response packet, a request packet for requesting third information that is different from the plurality of types of information obtained by the first obtainment process, and obtaining the third information in a response packet transmitted from the device that receives the request packet,
wherein the request packet transmitted in the second obtainment process is a packet for requesting a single type of information, and is a packet for requesting a Bonjour name, as the third information, that the second obtainment unit is able to obtain in a state that a predetermined function is turned on in the device and is not able to obtain in a state that the predetermined function is turned off in the device,
wherein the first obtainment unit is able to obtain the plurality of types of information based on the search packet, even in the state that the predetermined function is turned off in the device, and
wherein the second obtainment unit performs the second obtainment process after the first obtainment unit obtains the plurality of types of information, and the second obtainment unit does not perform the second obtainment process if the first obtainment unit does not obtain the plurality of types of information within a predetermined time.

2. The information processing apparatus according to claim 1,
wherein the first obtainment unit performs transmission of the search packet and reception of the response packet in the device searching processing.

3. The information processing apparatus according to claim 1,
wherein a device that is communicably connected with the information processing apparatus is identified based on the response packet received by the first obtainment unit.

4. The information processing apparatus according to claim 3,
wherein the device that is connected to the information processing apparatus is identified based on information obtained by the first obtainment unit.

5. The information processing apparatus according to claim 1,
wherein the predetermined function is a Bonjour function.

6. The information processing apparatus according to claim 1,
wherein the first obtainment unit transmits the request packet by unicasting to a device that has transmitted a response packet based on the search packet.

7. The information processing apparatus according to claim 1,
wherein the second obtainment unit transmits a request packet for requesting fourth information of which a type is different from any of the plurality of types of information and the third information after receiving a response packet including the third information.

8. The information processing apparatus according to claim 1,
wherein the plurality of types of information obtained by the first obtainment unit and the third information obtained by the second obtainment unit are associated with each other and stored in a storage unit.

9. The information processing apparatus according to claim 1,
wherein the second obtainment unit transmits the request packet to the device which has returned a response packet base on the search packet within a predetermined time period.

10. The information processing apparatus according to claim 1,
wherein the first obtainment unit transmits the search packet by broadcasting.

11. The information processing apparatus according to claim 1,
wherein the first obtainment unit transmits the search packet by multicasting.

12. The information processing apparatus according to claim 1,
wherein the SNMP is the SNMP version 1 protocol.

13. The information processing apparatus according to claim 1,
wherein the first information is any one of a MAC address, a serial number or a model name.

14. The information processing apparatus according to claim 1,
wherein the second information is any one of a MAC address, a serial number or a model name.

15. The information processing apparatus according to claim 1,
wherein a device having a printing function is searched as the device.

16. An information processing method performed by an image processing apparatus, comprising:
performing a first obtainment process including transmitting, using Simple Network Management Protocol (SNMP), a search packet for requesting a plurality of types of information including first information and second information, and obtaining the plurality of types of information in a response packet transmitted from a device that receives the search packet; and
performing a second obtainment process including transmitting, to the device that transmits the response packet, a request packet for requesting third information that is different from the plurality of types of information obtained by the first obtainment process, and obtaining the third information in a response packet transmitted from the device that receives the request packet,
wherein the request packet transmitted in the second obtainment process is a packet for requesting a single type of information, and is a packet for requesting a Bonjour name, as the third information, that the second obtainment process is able to obtain in a state that a predetermined function is turned on in the device and is not able to obtain in a state that the predetermined function is turned off in the device,
wherein the first obtainment process is able to obtain the plurality of types of information based on the search packet, even in the state that the predetermined function is turned off in the device, and
wherein the second obtainment process is performed after the first obtainment process obtains the plurality of types of information, and the second obtainment process is not performed if the first obtainment process does not obtain the plurality of types of information within a predetermined time.

17. The information processing method according to claim 16,
wherein the first obtainment processing performs transmission of the search packet and reception of the response packet in the device searching processing.

18. The information processing method according to claim 16,
wherein a device that is communicably connected with the information processing apparatus is identified based on the response packet received by the first obtainment processing.

19. The information processing method according to claim 18,
wherein the device that is connected to the information processing apparatus is identified based on information obtained by the first obtainment processing.

20. The information processing method according to claim 16,
wherein the predetermined function is a Bonjour function.

21. The information processing method according to claim 16,
wherein the first obtainment processing transmits the request packet by unicasting to a device that has transmitted a response packet based on the search packet.

22. The information processing method according to claim 16,
wherein the second obtainment processing transmits a request packet for requesting fourth information of which a type is different from any of the plurality of types of information and the third information after receiving a response packet including the third information.

23. The information processing method according to claim 16,
wherein the plurality of types of information obtained by the first obtainment processing and the third information obtained by the second obtainment processing are associated with each other and stored in a storage unit.

24. The information processing method according to claim 16,
wherein the second obtainment processing transmits the request packet to the device which has returned a response packet base on the search packet within a predetermined time period.

25. The information processing method according to claim 16,
wherein the first obtainment processing transmits the search packet by broadcasting.

26. The information processing method according to claim 16,
wherein the first obtainment processing transmits the search packet by multicasting.

27. The information processing method according to claim 16,
wherein the SNMP is the SNMP version 1 protocol.

28. The information processing method according to claim 16,
   wherein the first information is any one of a MAC address, a serial number or a model name.

29. The information processing method according to claim 16,
   wherein the second information is any one of a MAC address, a serial number or a model name.

30. The information processing method according to claim 16,
   wherein a device having a printing function is searched as the device.

* * * * *